United States Patent
Lin

(10) Patent No.: US 8,595,486 B2
(45) Date of Patent: Nov. 26, 2013

(54) SYSTEMS AND METHODS FOR AUTHORIZATION AND DATA TRANSMISSION FOR MULTICAST BROADCAST SERVICES

(75) Inventor: Tzu-Ming Lin, Jhubei (TW)

(73) Assignee: Industrial Technology Research Institute, Hsinchu (TW)

( * ) Notice: Subject to any disclaimer, the term of this patent is extended or adjusted under 35 U.S.C. 154(b) by 336 days.

(21) Appl. No.: 12/486,125

(22) Filed: Jun. 17, 2009

(65) Prior Publication Data

US 2010/0014674 A1    Jan. 21, 2010

Related U.S. Application Data

(60) Provisional application No. 61/081,011, filed on Jul. 15, 2008.

(51) Int. Cl.
  *H04L 29/06*    (2006.01)
(52) U.S. Cl.
  CPC .................................. *H04L 63/065* (2013.01)
  USPC ........................................................ 713/163
(58) Field of Classification Search
  USPC ......................................................... 713/163
  See application file for complete search history.

(56) References Cited

U.S. PATENT DOCUMENTS

| | | | |
|---|---|---|---|
| 2002/0172366 A1 | 11/2002 | Peterka et al. | |
| 2004/0230540 A1* | 11/2004 | Crane et al. | 705/76 |
| 2008/0101376 A1 | 5/2008 | Do et al. | |
| 2009/0196424 A1* | 8/2009 | Germaneau et al. | 380/277 |
| 2009/0219850 A1* | 9/2009 | Lin et al. | 370/312 |
| 2009/0235075 A1* | 9/2009 | Cho et al. | 713/170 |

FOREIGN PATENT DOCUMENTS

CN    101150396    3/2008

* cited by examiner

*Primary Examiner* — Peter Shaw
(74) *Attorney, Agent, or Firm* — Finnegan, Henderson, Farabow, Garrett & Dunner, LLP

(57) ABSTRACT

A method for a base station to provide multicast broadcast services (MBSs). The method includes: obtaining an MBS authorization key (MAK); generating a number as an MBS group traffic encryption key (MGTEK); using a service credit number (SCN) to count an amount of service time or MBS content data; generating an MBS traffic key (MTK) based on at least the MAK and the MGTEK; encrypting MBS content data with the MTK; and transmitting the encrypted MBS content data to provide the MBSs.

15 Claims, 18 Drawing Sheets

SYSTEMS AND METHODS FOR AUTHORIZATION AND DATA TRANSMISSION FOR MULTICAST BROADCAST SERVICES

RELATED APPLICATIONS

This application is based upon and claims the benefit of priority from U.S. Provisional Patent Application Nos. 61/081,011, filed Jul. 15, 2008, the entire contents of which are incorporated herein by reference.

FIELD OF THE DISCLOSURE

This disclosure relates to systems and methods for authorization and data transmission for multicast broadcast services (MBSs).

BACKGROUND

Multicast and/or broadcast services (MBSs), also known as multimedia broadcast multicast services (MBMSs), provide content data to a plurality of users who desire to receive such service in a communication network. For example, the content data may be movies, games, files, software programs, or TV programs, and is usually provided by one or more content providers.

FIG. 1 illustrates a block diagram of a conventional communication system 100 for providing MBSs. The communication system 100 includes one or more MBS content servers such as MBS content servers 102-1, 102-2, and 102-3, and one or more base stations (BSs) such as base stations 104-1 and 104-2. For example, the MBS content server 102-1 and the base stations 104-1 and 104-2 may be in a network 106, and the MBS content servers 102-2 and 102-3 may be outside the network 106. In addition, the communication system 100 further includes at least one subscriber station (SS) 108 to receive MBSs from the base stations 104-1 and/or 104-2.

Conventionally, the communication system 100 provides MBSs based on a communication standard, such as a digital video broadcasting (DVB) standard or an IEEE 802.16 standard. For example, based on the DVB standard, the base station 104-1 or 104-2 receives MBS content data from one or more of the MBS content servers 102-1,102-2, and 102-3. The base station 104-1 or 104-2 then transmits the received MBS content data to the subscriber station 108. Typically, to prevent unauthorized users from receiving the MBSs, the MBS content data is encrypted in an application layer or based on an Internet Protocol Security (IPSEC) mechanism in a Transmission Control Protocol/Internet Protocol (TCP/IP) layer. However, data transmission between the base station 104-1 or 104-2 and the subscriber station 108 may not be encrypted.

Also for example, based on the IEEE 802.16 standard, the base station 104-1 or 104-2 receives MBS content data from one or more of the MBS content servers 102-1, 102-2, and 102-3. The base station 104-1 or 104-2 may, in order to prevent unauthorized users from receiving the MBSs, encrypt the received MBS content data with an MBS traffic key (MTK), and transmit the encrypted MBS content data to the subscriber station 108. If an MBS does not need encryption protection, the base station 104-1 or 104-2 may not encrypt MBS content data for that MBS.

FIG. 2 illustrates a conventional method 200 to generate an MTK 202 based on the IEEE 802.16 standard. For example, a base station, such as the base station 104-1 or 104-2 (FIG. 1), may obtain a master key, such as an MBS authorization key (MAK) 204, from an MBS content server, such as the MBS content server 102-1, 102-2, or 102-3 (FIG. 1), or a third party server, such as an Authentication Authorization Accounting (AAA) server, while performing authorization with the MBS content server. The base station also generates a random number as an MBS group traffic encryption key (MGTEK) 206. The base station further uses a function, e.g., the Dot16KDF function, to generate the MTK 202. In addition, the base station transmits the MGTEK 206 to a subscriber station such as the subscriber station 108 (FIG. 1) based on, e.g., the Privacy and Key Management version 2 (PKMv2) protocol. Similarly, the subscriber station may obtain the MAK 204 from the MBS content server during authorization, and use the MAK 204 and the MGTEK 206 received from the base station to generate the MTK 202. Accordingly, the base station may use the MTK 202 to encrypt MBS content data, and the subscriber station may use the MTK 202 to decrypt encrypted MBS content data received from the base station, thereby to receive the MBSs. However, security problems may occur based on the conventional method 200. For example, when the conventional method 200 is used, a tricky user may have unauthorized access to encrypted MBS content data, as described below. A tricky user is a user terminal that uses key information that is obtained when the tricky user is an authorized user to decrypt encrypted MBS content data that is received when the tricky user is an unauthorized user.

FIG. 3 illustrates a conventional MBS data transmission process 300, in which security problems may occur. Referring to FIG. 3, an MBS content server 302 transmits MBS content data to a base station 304. The base station 304 encrypts the MBS content data with an MTK and transmits the encrypted MBS content data to authorized users such as subscriber stations 306-1 and 306-2. However, a tricky user 306-3, which is currently an unauthorized user terminal, may also receive the encrypted MBS content data by unauthorized access to the base station 304 (308). The tricky user 306-3 may store the encrypted MBS content data in a buffer. Later, when the tricky user 306-3 joins the MBSs and finishes authorization with the MBS content server 302 (310), the tricky user 306-3 becomes a subscriber and obtains the MTK. The tricky user 306-3 may then use the MTK to decrypt the encrypted MBS content data stored in the buffer that was received before the tricky user 306-3 joined the MBSs.

FIG. 4 illustrates a conventional MBS data transmission process 400, in which security problems may occur. Referring to FIG. 4, an MBS content server 402 transmits MBS content data to a base station 404. The base station 404 encrypts the MBS content data with an MTK and transmits the encrypted MBS content data to authorized users. Because subscriber stations 406-1 and 406-2 and a tricky user 406-3 join the MBSs and perform authorization with the MBS content server 402 (408), they have the MTK to decrypt the encrypted MBS content data received from the base station 404 (410). Later, the tricky user 406-3 leaves the MBSs (412). However, because the tricky user 406-3 has the MTK, the tricky user 406-3 may continue to receive encrypted MBS content data by unauthorized access to the base station 404 and decrypt the encrypted MBS content data to receive the MBSs (414).

SUMMARY

According to a first aspect of the present disclosure, there is provided a method for a base station to provide multicast broadcast services (MBSs), comprising: obtaining an MBS authorization key (MAK); generating a number as an MBS group traffic encryption key (MGTEK); using a service credit number (SCN) to count an amount of service time or MBS content data; generating an MBS traffic key (MTK) based on at least the MAK and the MGTEK; encrypting MBS content data with the MTK; and transmitting the encrypted MBS content data to provide the MBSs.

According to a second aspect of the present disclosure, there is provided a base station to provide multicast broadcast services (MBSs), comprising: a processor, the processor being configured to: obtain an MBS authorization key (MAK); generate a number as an MBS group traffic encryption key (MGTEK); use a service credit number (SCN) to count an amount of service time or MBS content data; generate an MBS traffic key (MTK) based on at least the MAK and the MGTEK; and encrypt MBS content data with the MTK.

According to a third aspect of the present disclosure, there is provided a method for a subscriber station to receive multicast broadcast services (MBSs) from a base station, comprising: obtaining an MBS authorization key (MAK); receiving, from the base station, an MBS group traffic encryption key (MGTEK) and encrypted MBS content data; generating an MBS traffic key (MTK) based on the MAK and the MGTEK; and decrypting the encrypted MBS content data with the MTK to receive the MBSs; wherein the MGTEK is a number generated by the base station; and the MGTEK is updated according to a service credit number (SCN), the SCN being used by the base station to count an amount of service time or MBS content data.

According to a fourth aspect of the present disclosure, there is provided a subscriber station to receive multicast broadcast services (MBSs) from a base station, comprising: a processor, the processor being configured to: obtain an MBS authorization key (MAK); receive, from the base station, an MBS group traffic encryption key (MGTEK) and encrypted MBS content data; generate an MBS traffic key (MTK) based on the MAK and the MGTEK; and decrypt the encrypted MBS content data with the MTK; wherein the MGTEK is a number generated by the base station; and the MGTEK is updated according to a service credit number (SCN), the SCN being used by the base station to count an amount of service time or MBS content data.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and, together with the description, serve to explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention as recited in the appended claims.

In exemplary embodiments, there are provided systems and methods for authorization and data transmission for multicast broadcast services (MBSs), also known as multimedia broadcast multicast services (MBMSs). Based on the provided systems and methods, an MBS traffic key (MTK) may be generated and updated at both a base station (BS) providing the MBSs and a subscriber station (SS) receiving the MBSs. The base station may use the MTK to encrypt MBS content data, and the subscriber station may use the MTK to decrypt the encrypted MBS data received from the base station.

Figure 1:
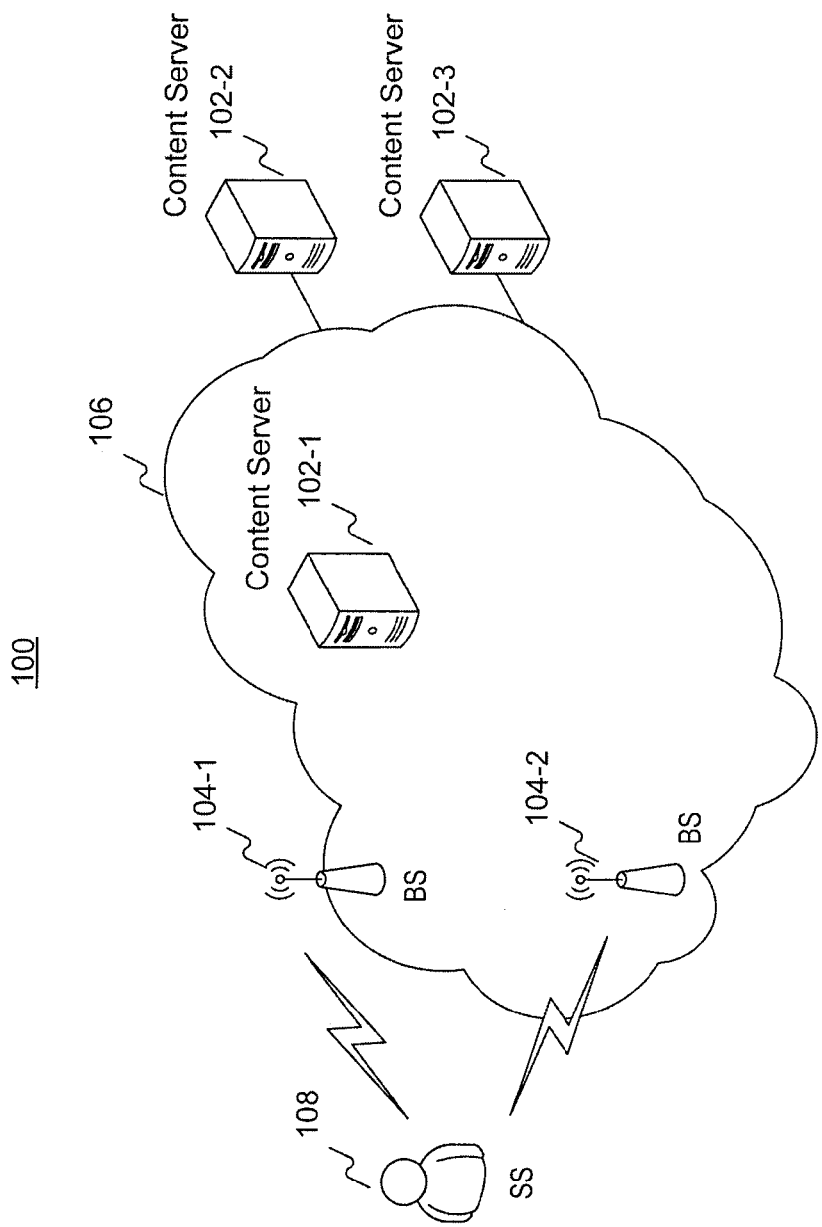
FIG. 1 illustrates a block diagram of a conventional communication system for providing multicast broadcast services (MBSs).
Figure 2:
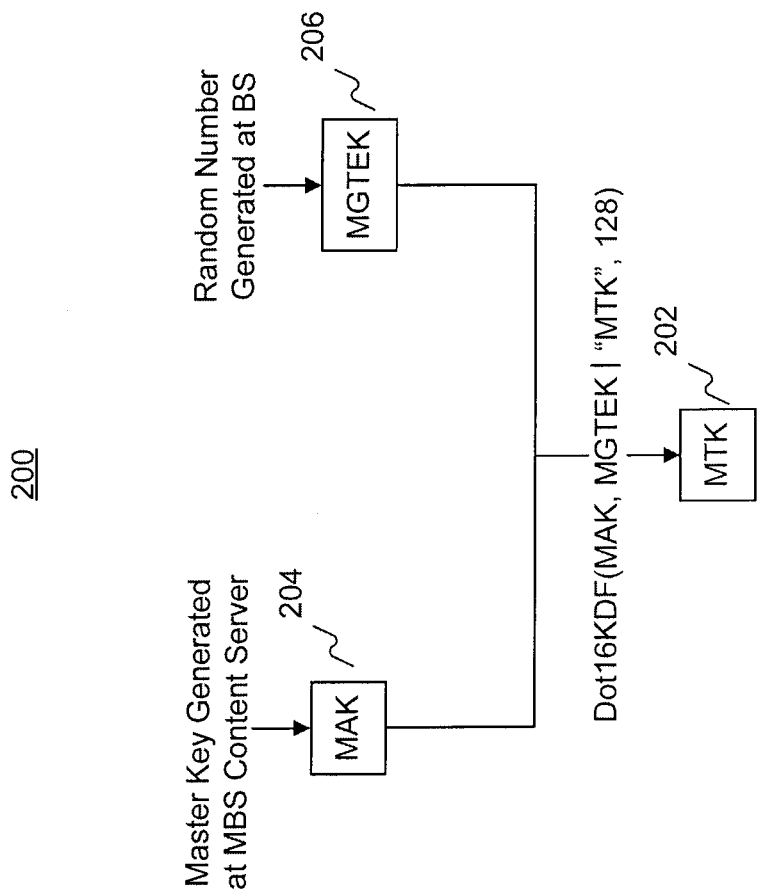
FIG. 2 illustrates a conventional method to generate an MBS traffic key (MTK) based on the IEEE 802.16 standard.
Figure 3:
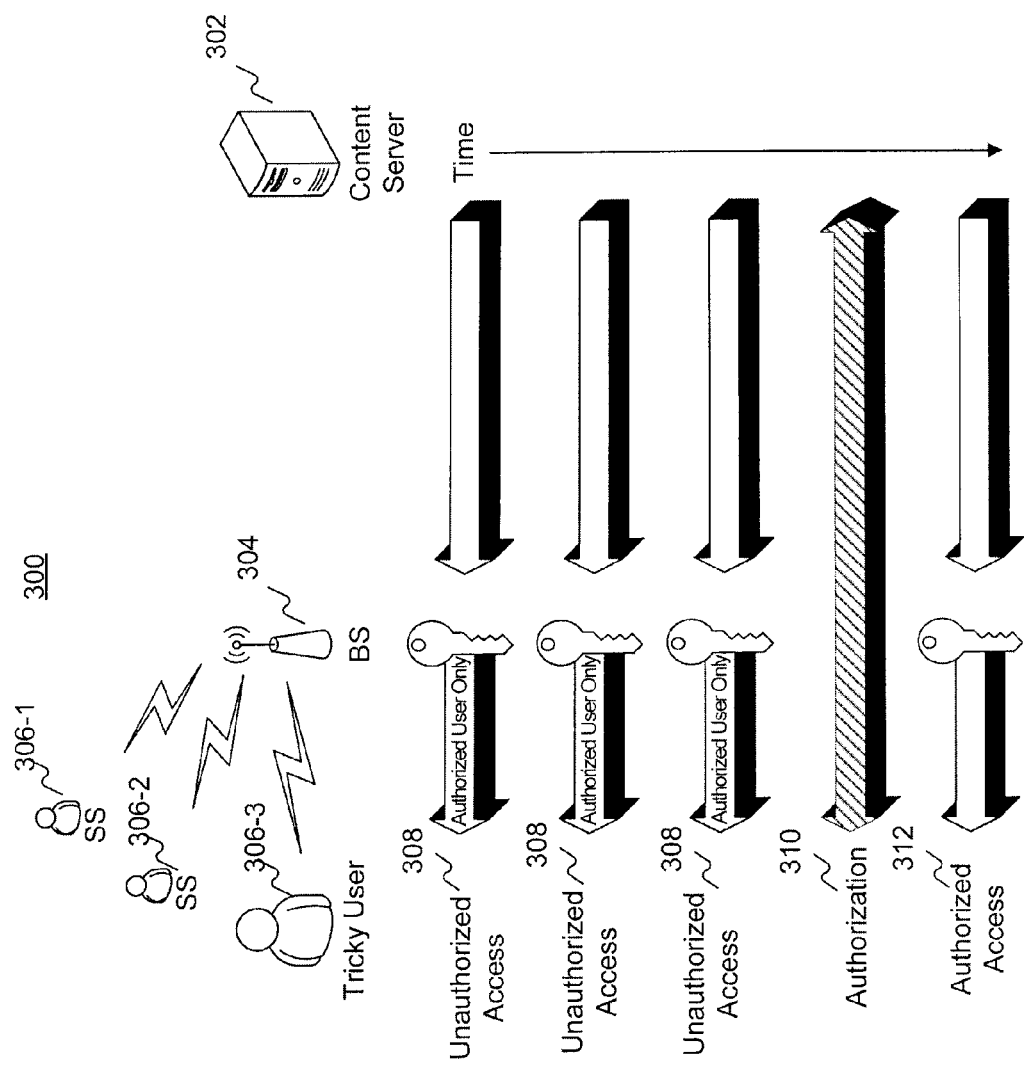
FIG. 3 illustrates a conventional MBS data transmission process.
Figure 4:
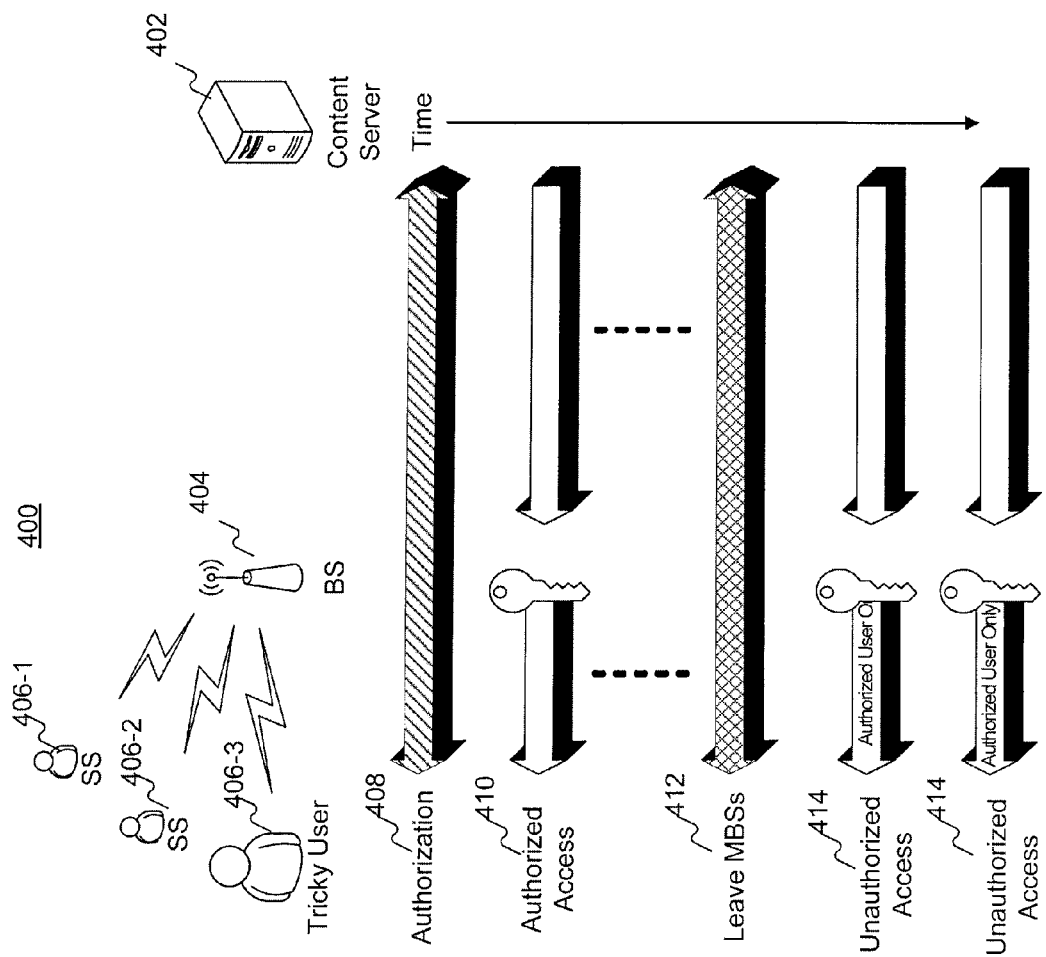
FIG. 4 illustrates a conventional MBS data transmission process.
Figure 5:
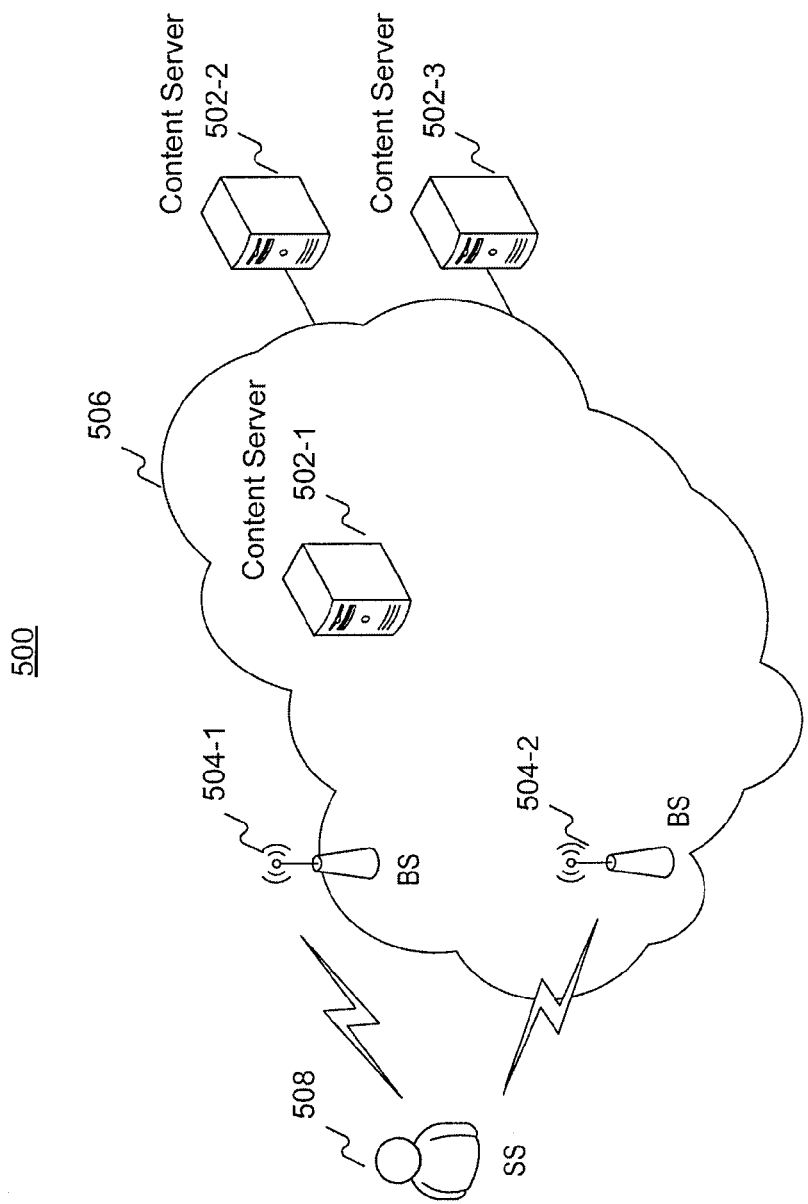
FIG. 5 illustrates a block diagram of a communication system for providing MBSs, according to an exemplary embodiment.

FIG. 5 illustrates a block diagram of a communication system 500 for providing MBSs, according to an exemplary embodiment. The communication system 500 includes one or more MBS content servers such as first, second, and third MBS content servers 502-1, 502-2, and 502-3, and one or more base stations (BSs) such as first and second base stations 504-1 and 504-2. For example, the MBS content server 502-1 and the base stations 504-1 and 504-2 may be in a network 506, and the MBS content servers 502-2 and 502-3 may be outside the network 506. In addition, the communication system 500 may further include at least one subscriber station (SS) 508 to receive the MBSs from the base stations 504-1 and/or 504-2.

In exemplary embodiments, the base station 504-1 or 504-2 receives MBS content data from one or more of the MBS content servers 502-1, 502-2, and 502-3. The base station 504-1 or 504-2 is configured to generate an MTK based on methods consistent with the present invention, as described below, and use the MTK to encrypt the MBS content data. The subscriber station 508 is configured to generate the MTK based on methods consistent with the present invention, as described below, and use the MTK to decrypt the encrypted MBS content data received from base station 504-1 or 504-2.

Figure 6:
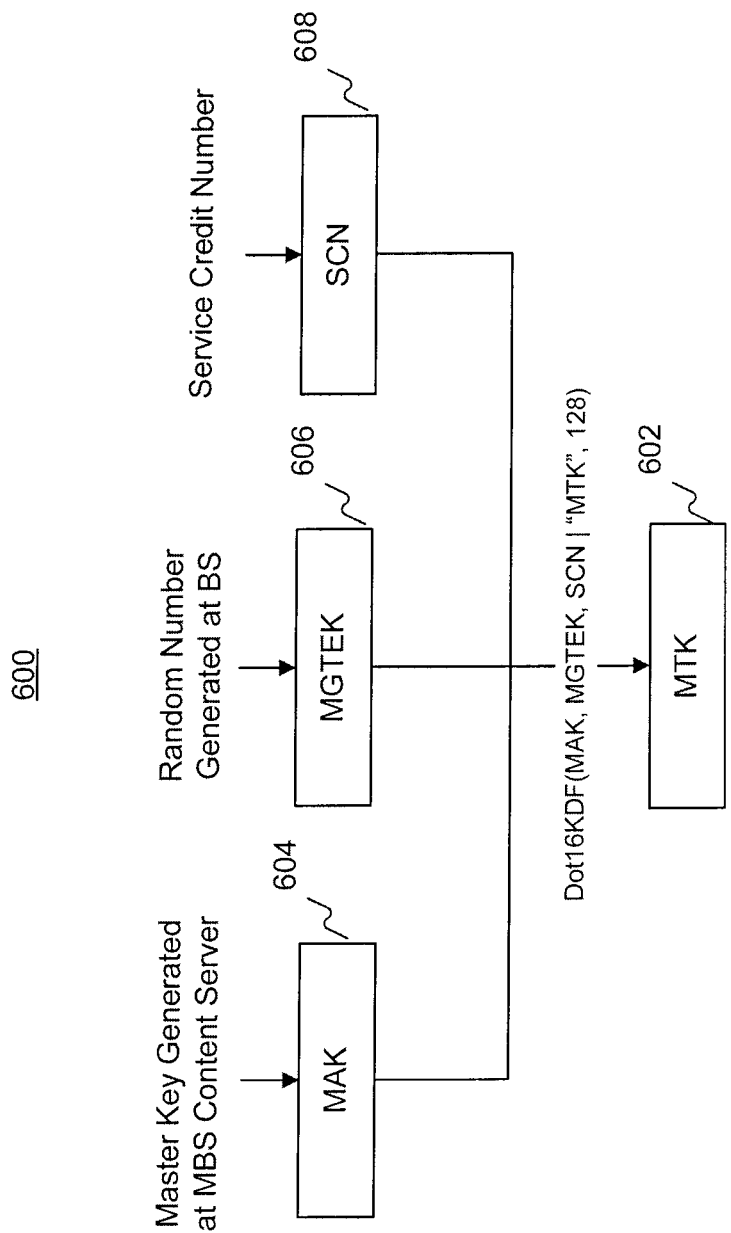
FIG. 6 illustrates a method to generate an MTK, according to an exemplary embodiment.

FIG. 6 illustrates a method 600 to generate an MTK 602, according to an exemplary embodiment. For example, a base station, such as the base station 504-1 or 504-2 (FIG. 5), may use a function, e.g., the Dot16KDF function, to generate the MTK 602 based on an MBS authorization key (MAK) 604, an MBS group traffic encryption key (MGTEK) 606, and a service credit number (SCN) 608.

In exemplary embodiments, the MAK 604 is a master key to generate other keys. For example, the base station may obtain the MAK 604 from an MBS content server such as the MBS content server 502-1, 502-2, or 502-3 (FIG. 5). In such situation, the MBS content server also operates as an authentication, authorization, accounting (AAA) server.

In exemplary embodiments, the MGTEK 606 is a number, e.g., a random number, generated by the base station, and may be transmitted based on a protocol, e.g., the Privacy and Key Management version 2 (PKMv2) protocol provided in the IEEE 802.16 standard, to a subscriber station receiving the MBSs, such as the subscriber station 508 (FIG. 5).

In exemplary embodiments, the SCN 608 is a parameter used by the base station to count, e.g., an amount of service time or an amount of MBS content data. In other words, the SCN 608 is updated as the base station transmits MBS content data. The SCN 608 may also be transmitted to the subscriber station based on a protocol, e.g., the PKMv2 protocol.

In exemplary embodiments, the subscriber station may obtain the MAK 604 from the MBS content server. Alternatively, the MAK 604 may be set in the subscriber station, or a user may input the MAK 604 to the subscriber station. The subscriber station may further receive the MGTEK 606 and the SCN 608 from the base station. As a result, the subscriber station may also use the function, e.g., the Dot16KDF function, to generate the MTK 602 based on the MAK 604, the MGTEK 606, and the SCN 608.

As noted above, the SCN 608 is used by the base station to count the amount of service time or MBS content data, and is therefore updated as the base station transmits MBS content data. In exemplary embodiments, when the SCN 608 is updated, the base station uses the updated SCN 608 to update the MTK 602. As a result, for example, the base station updates the MTK 602 for each ten minutes of service time, or for each ten megabytes (MB) of transmitted MBS content data.

Before the base station uses the updated SCN 608 to update the MTK 602, the base station also transmits the updated SCN 608 to the subscriber station, and notifies the subscriber of a time to update the MTK 602. When it is the time to update the MTK 602, the base station and subscriber station both use the updated SCN 608 to update the MTK 602.

Figure 7:
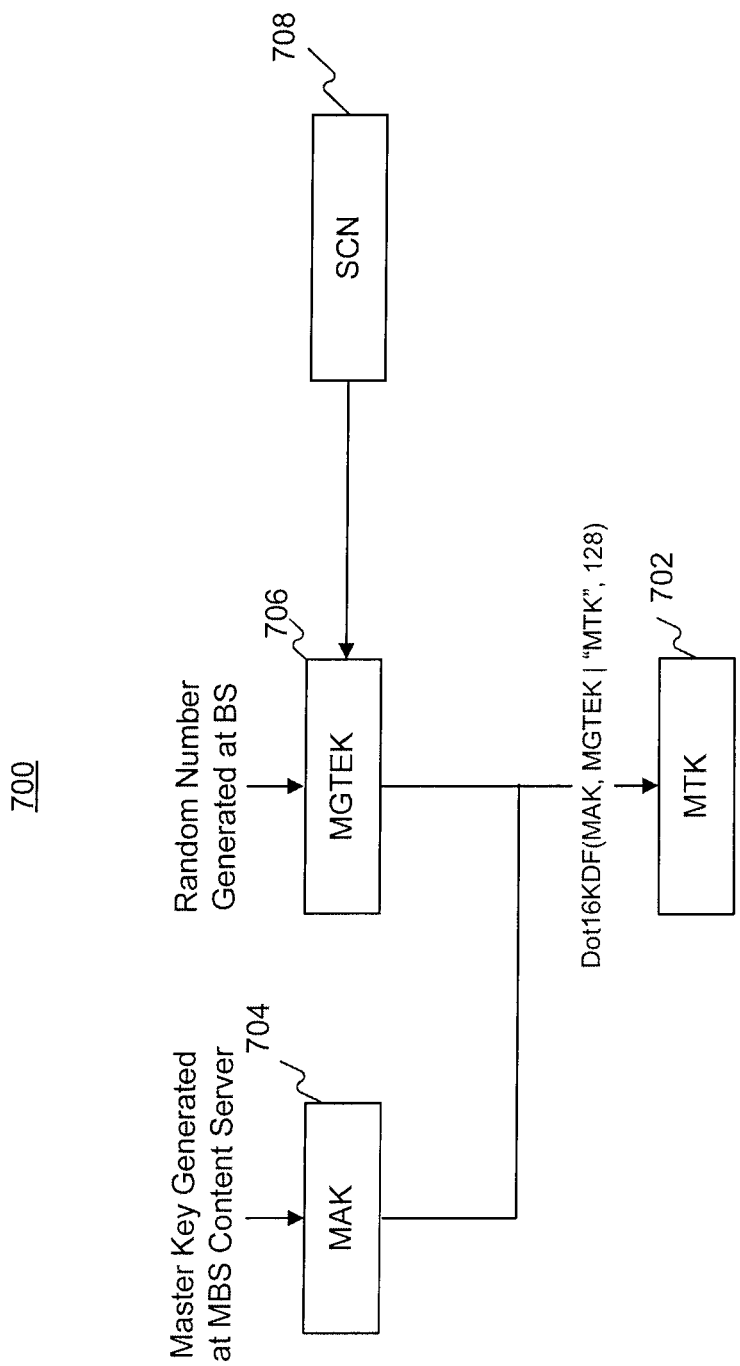
FIG. 7 illustrates a method to generate an MTK, according to an exemplary embodiment.

FIG. 7 illustrates a method 700 to generate an MTK 702, according to an exemplary embodiment. For example, a base station, such as the base station 504-1 or 504-2 (FIG. 5), may use a function, e.g., the Dot16KDF function, to generate the MTK 702 based on an MBS authorization key (MAK) 704 and an MBS group traffic encryption key (MGTEK) 706, wherein the MGTEK 706 is triggered to be updated when a service credit number (SCN) 708 is updated.

In exemplary embodiments, the MAK 704 is a master key to generate other keys. For example, the base station may receive the MAK 704 from an MBS content server such as the MBS content server 502-1, 502-2, or 502-3. In such situation, the MBS content server also operates as an authentication, authorization, accounting (AAA) server.

In exemplary embodiments, the MGTEK 706 is a number, e.g., a random number, generated by the base station, and may be transmitted based on a protocol, e.g., the Privacy and Key Management version 2 (PKMv2) protocol provided in the IEEE 802.16 standard, to a subscriber station receiving the MBSs, such as the subscriber station 508 (FIG. 5).

In exemplary embodiments, the SCN 708 is a parameter used by the base station to count, e.g., an amount of service time or an amount of MBS content data. In other words, the SCN 708 is updated as the base station transmits MBS content data. Different from the method 600 (FIG. 6), the SCN 708 is not transmitted to the subscriber station.

In exemplary embodiments, the subscriber station may obtain the MAK 704 from the MBS content server. Alternatively, the MAK 704 may be set in the subscriber station, or a user may input the MAK 704 to the subscriber station. The subscriber station may further receive the MGTEK 706 from the base station. As a result, the subscriber station may also use the function, e.g., the Dot16KDF function, to generate the MTK 702 based on the MAK 704 and the MGTEK 706.

As noted above, the SCN 708 may be used by the base station to count the amount of service time or MBS content data, and is therefore updated as the base station transmits MBS content data. In exemplary embodiments, when the SCN 708 is updated, the base station is triggered to update the MGTEK 706, and use the updated MGTEK 706 to update the MTK 702. As a result, for example, the base station updates the MTK 702 for each ten minutes of service time, or for each ten megabytes (MB) of transmitted MBS content data.

Figure 8:
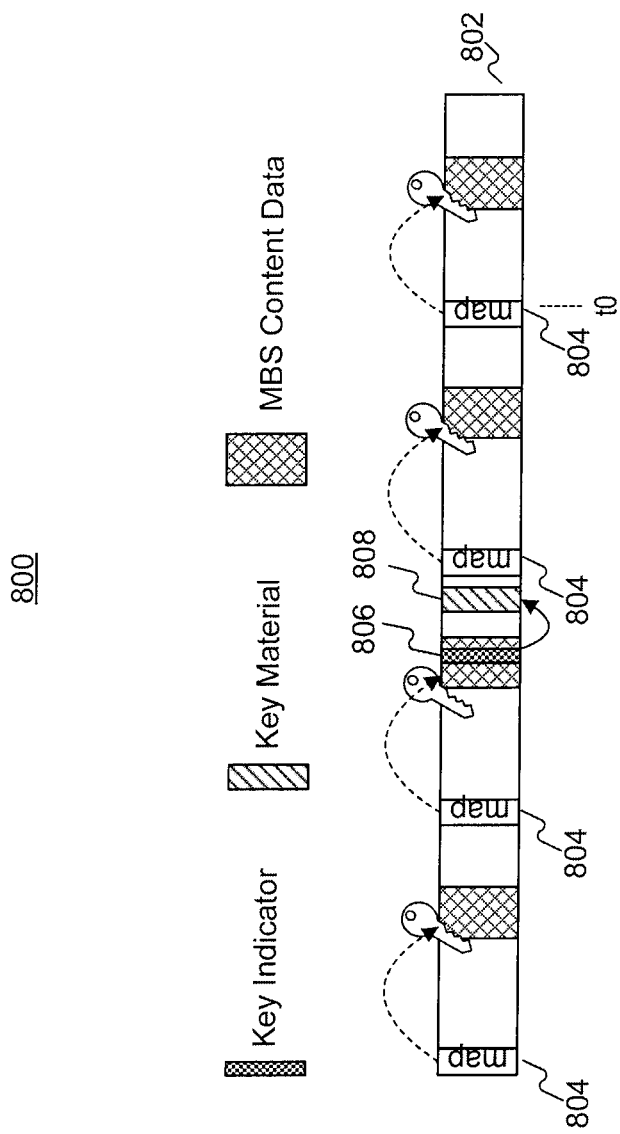
FIG. 8 illustrates a method to update an MTK, according to an exemplary embodiment.

FIG. 8 illustrates a method 800 to update an MTK, according to an exemplary embodiment. For example, a base station, such as the base station 504-1 (FIG. 5), and a subscriber station, such as the subscriber station 508 (FIG. 5), may use the method 800 to update the MTK.

Referring to FIGS. 5 and 8, the base station 504-1 transmits data frames 802 for providing MBSs. The data frames 802 include maps 804 to indicate time and frequency resources allocated for MBS content data. As a result, based on the maps 804, the subscriber station can determine when and where to read the MBS content data following each of the maps 804, as indicated by the dashed arrows in FIG. 8. In addition, the MBS content data is encrypted with the MTK. When an event occurs, for example, when a new subscriber station (not shown) joins the MBSs, or when another subscriber station (not shown) leaves the MBSs or runs out of credit, or when the subscriber station 508 has received the MBSs for a predetermined amount of service time or MBS content data, the base station 504-1 may determine to update the MTK.

In exemplary embodiments, before the base station 504-1 updates the MTK, the base station transmits a key indicator 806, the key indicator 806 indicating time and frequency resources allocated for key material 808, as indicated by the solid arrow in FIG. 8. The key material 808 includes key information for the subscriber station 508 to update the MTK. For example, if the base station 504-1 uses the method 600 (FIG. 6) to generate the MTK, the key material 808 may include an updated SCN. Also for example, if the base station 504-1 uses the method 700 (FIG. 7) to generate the MTK, the key material 808 may include an updated MGTEK. The base station further transmits the key material 808 according to the time and frequency resources indicated by the key indicator 806.

In exemplary embodiments, the base station 504-1 separately transmits the key material 808 and the encrypted MBS content data. Accordingly, when the subscriber station 508 receives the key indicator 806, the subscriber station 508 may read the key material 808 for updating the MTK. In addition, at least one of the key indicator 806 or the key material 808 may include information regarding a time t0 or an event, e.g., a message or another indicator, for updating the MTK. As a result, the subscriber station 508 should further know when to update the MTK.

In exemplary embodiments, before the time t0, the base station 504-1 still uses the present MTK to encrypt MBS content data, and the subscriber station 508 still uses the present MTK to decrypt the encrypted MBS data received from the base station 504-1. At time t0 or when the event occurs, the base station 504-1 and the subscriber station 508 both update the present MTK to generate an updated MTK. Accordingly, for example, the base station 504-1 uses the updated MTK to encrypt MBS content data, and the subscriber station 508 uses the updated MTK to decrypt the encrypted MBS content data received from the base station 504-1. Because the base station 504-1 separately transmits the key material 808 and the encrypted MBS content data, a tricky user should not be able to obtain the key material 808 by buffering the encrypted MBS content data. Accordingly, the tricky user should not have the updated MTK to decrypt the buffered MBS content data.

In exemplary embodiments, a base station may also use an SCN for authorization and billing purposes, in addition to generating an MTK. For example, referring back to FIG. 5, the base station 504-1 may use an SCN to count an amount of service time for, e.g., a movie. The base station 504-1 may update the SCN for each ten minutes of transmitted movie. After updating the SCN for, e.g., ten times, which corresponds to one hundred minutes of transmitted movie, the base station 504-1 may request the subscriber station 508 to perform reauthorization with, e.g., the MBS content server 502-1, to ensure that the subscriber station 508 has enough credit to continue to receive the MBS. If the MBS content server 502-1 determines that the subscriber station 508 has enough credit to continue to receive the MBS, the MBS content server 508 updates the MAK, and sends the updated MAK to the subscriber station 508 and the base station 504-1. As a result, the subscriber station 508 and the base station 504-1 further update the MTK based on the updated MAK, and the subscriber station 508 continues to receive the MBS.

Also for example, the base station 504-1 may use an SCN to count an amount of MBS content data for, e.g., a movie. The base station 504-1 may update the SCN for each 5 MB of transmitted movie. After updating the SCN for, e.g., thirty times, which corresponds to 150 MB of transmitted movie, the base station 504-1 may request the subscriber station 508 to perform reauthorization with, e.g., the MBS content server 502-1, to ensure that the subscriber station 508 has enough credit to continue to receive the MBS. If the MBS content server 502-1 determines the subscriber station 508 has enough credit to continue to receive the MBS, the MBS content server 502-1 updates the MAK, and sends the updated MAK to the subscriber station 508 and the base station 504-1. As a result, the subscriber station 508 and the base station 504-1 further update the MTK based on the updated MAK, and the subscriber station 508 continues to receive the MBS.

Figure 9:
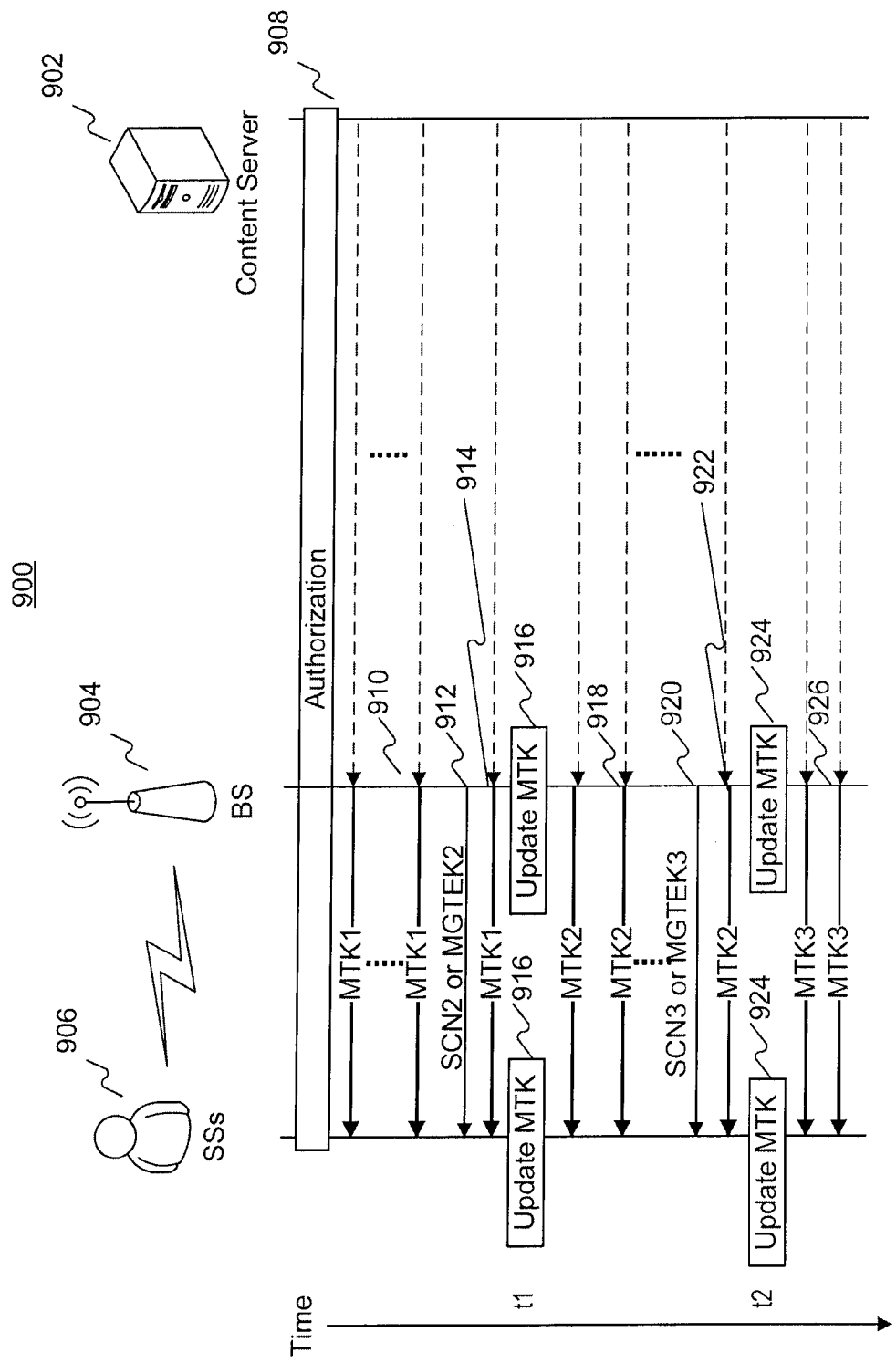
FIG. 9 illustrates an MTK updating process, according to an exemplary embodiment.

FIG. 9 illustrates an MTK updating process 900, according to an exemplary embodiment. Referring to FIG. 9, an MBS content server 902, a base station 904, and subscriber stations 906 are shown to illustrate the MTK updating process 900. For example, the MBS content server 902 may be the MBS content server 502-1, 502-2, or 502-3 (FIG. 5), the base station 904 may be the base station 504-1 or 504-2 (FIG. 5), and any one of the subscriber stations 906 may be the subscriber station 508 (FIG. 5).

In exemplary embodiments, the base station 904 and the subscriber stations 906 perform authorization with the MBS content server 902 to obtain a MAK (908). The base station 904 and the subscriber stations 906 further generate an MTK, e.g., MTK1, based on the MAK. Accordingly, the base station 904 uses MTK1 to encrypt MBS content data, and the subscriber stations 906 uses MTK1 to decrypt the encrypted MBS content data received from the base station 904 (910).

After a time period of service, an event may occur that causes the base station 904 to determine to update the MTK, as described above. Accordingly, the base station 904 multicasts key material including an SCN SCN2 or an MGTEK MGTEK2 to the subscriber stations 906, and notifies the subscriber stations 906 to update the MTK at a first time t1 or when a first event occurs (912). Before the time t1 or the first event occurs for updating the MTK, the base station 904 still uses MTK1 to encrypt MBS content data, and the subscriber stations 906 still use MTK1 to decrypt the encrypted MBS data received from the base station 904 (914).

At time t1 or when the first event occurs, the base station 904 and the subscriber stations 906 update the MTK to generate an updated MTK, e.g., MTK2, based on SCN2 or MGTEK2 (916). Accordingly, the base station 904 uses MTK2 to encrypt MBS content data, and the subscriber stations 906 uses MTK2 to decrypt the encrypted MBS content data received from the base station 904 (918).

Similarly, after another time period of service, another event may occur that causes the base station 904 to determine to update the MTK, as described above. Accordingly, the base station 904 multicasts key material including an updated SCN SCN3 or an updated MGTEK MGTEK3 to the subscriber stations 906, and notifies the subscriber stations 906 to update the MTK at a second time t2 or when a second event occurs (920). Before the time t2 or the second event occurs for updating the MTK, the base station 904 still uses MTK2 to encrypt MBS content data, and the subscriber stations 906 still use MTK2 to decrypt the encrypted MBS data received from the base station 904 (922).

At time t2 or when the second event occurs, the base station 904 and the subscriber stations 906 update the MTK to generate an updated MTK, e.g., MTK3, based on SCN3 or MGTEK3 (924). Accordingly, the base station 904 uses MTK3 to encrypt MBS content data, and the subscriber stations 906 uses MTK3 to decrypt the encrypted MBS content data received from the base station 904 (926). As the above described process is repeated, the base station 904 and the subscriber stations 906 further update the MTK.

Figure 10:
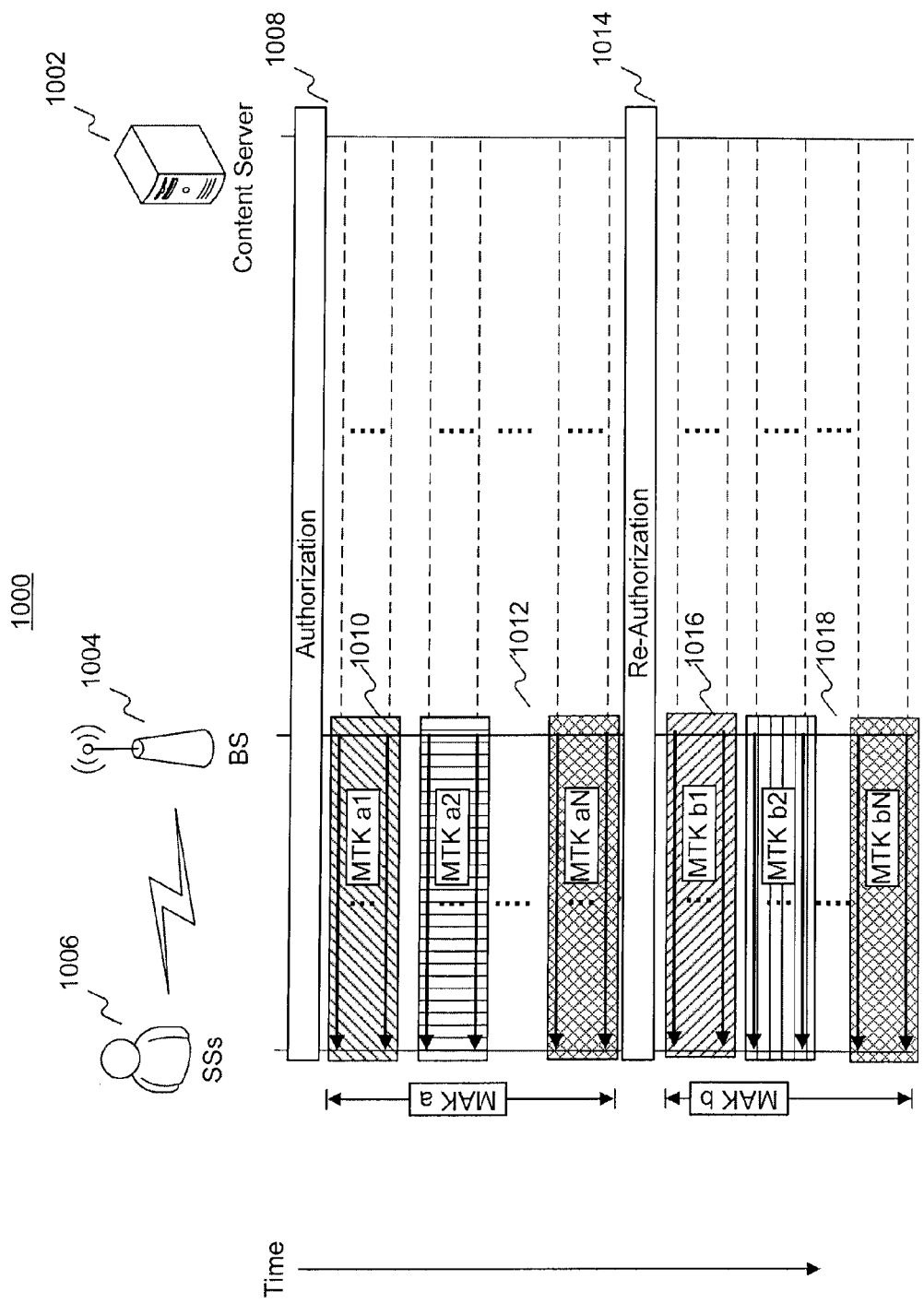
FIG. 10 illustrates an MBS authorization key (MAK) updating process, according to an exemplary embodiment.

FIG. 10 illustrates an MAK updating process 1000, according to an exemplary embodiment. As described above, after updating an SCN for, e.g., thirty times, a base station may request a subscriber station to perform reauthorization with an MBS content server, to ensure that the subscriber station has enough credit to continue to receive the MBS. If the MBS content server determines that the subscriber station has enough credit to continue to receive the MBS, the base station and the mobile station may perform MAK updating.

Referring to FIG. 10, an MBS content server 1002, a base station 1004, and subscriber stations 1006 are shown to illustrate the MAK updating process 1000. For example, the MBS content server 1002 may be the MBS content server 502-1, 502-2, or 502-3 (FIG. 5), the base station 1004 may be the base station 504-1 or 504-2 (FIG. 5), and any one of the subscriber stations 1006 may be the subscriber station 508 (FIG. 5).

In exemplary embodiments, the base station 1004 and the subscriber stations 1006 perform authorization with the MBS content server 1002 to obtain a MAK, e.g., MAK a (1008). The base station 1004 and the subscriber stations 1006 further generate an MTK, e.g., MTK a1, based on MAK a, an MGTEK, and/or an SCN. The base station 1004 then encrypts MBS content data with MTK a1, and the subscriber stations 1006 decrypt with MTK a1 the encrypted MBS content data received from the base station 1004 (1010). Each time an event occurs that causes the base station 1004 to determine to update the MTK, as described above, the base station 1004 and the subscriber stations 1006 update their MTK to, e.g., MTK a2, . . . , MTK aN, based on MAK a (1012).

In exemplary embodiments, when the SCN is updated a predetermined number of times, e.g., thirty times, the base station 1004 may request the subscriber stations 1006 to perform reauthorization with the MBS content server 1002 (1014). If the MBS content server 1002 determines that the subscriber stations 1006 each have enough credit to continue to receive the MBS, the subscriber stations 1006 may each obtain an updated MAK, e.g., MAK b. The base station 1004 and the subscriber stations 1006 further update the MTK to generate an updated MTK, e.g., MTK b1, based on MAK b.

The base station 1004 then encrypts MBS content data with MTK b1, and the subscriber stations 1006 decrypt the encrypted MBS content data received from the base station 1004 with MTK b1 (1016). Each time an event occurs that causes the base station 1004 to determine to update the MTK, as described above, the base station 1004 and the subscriber stations 1006 update their MTK to, e.g., MTK b2, . . . , MTK bN, based on MAK b (1018). As the above process is repeated, the base station 1004 and the subscriber station 1006 may update their MAK.

Figure 11:
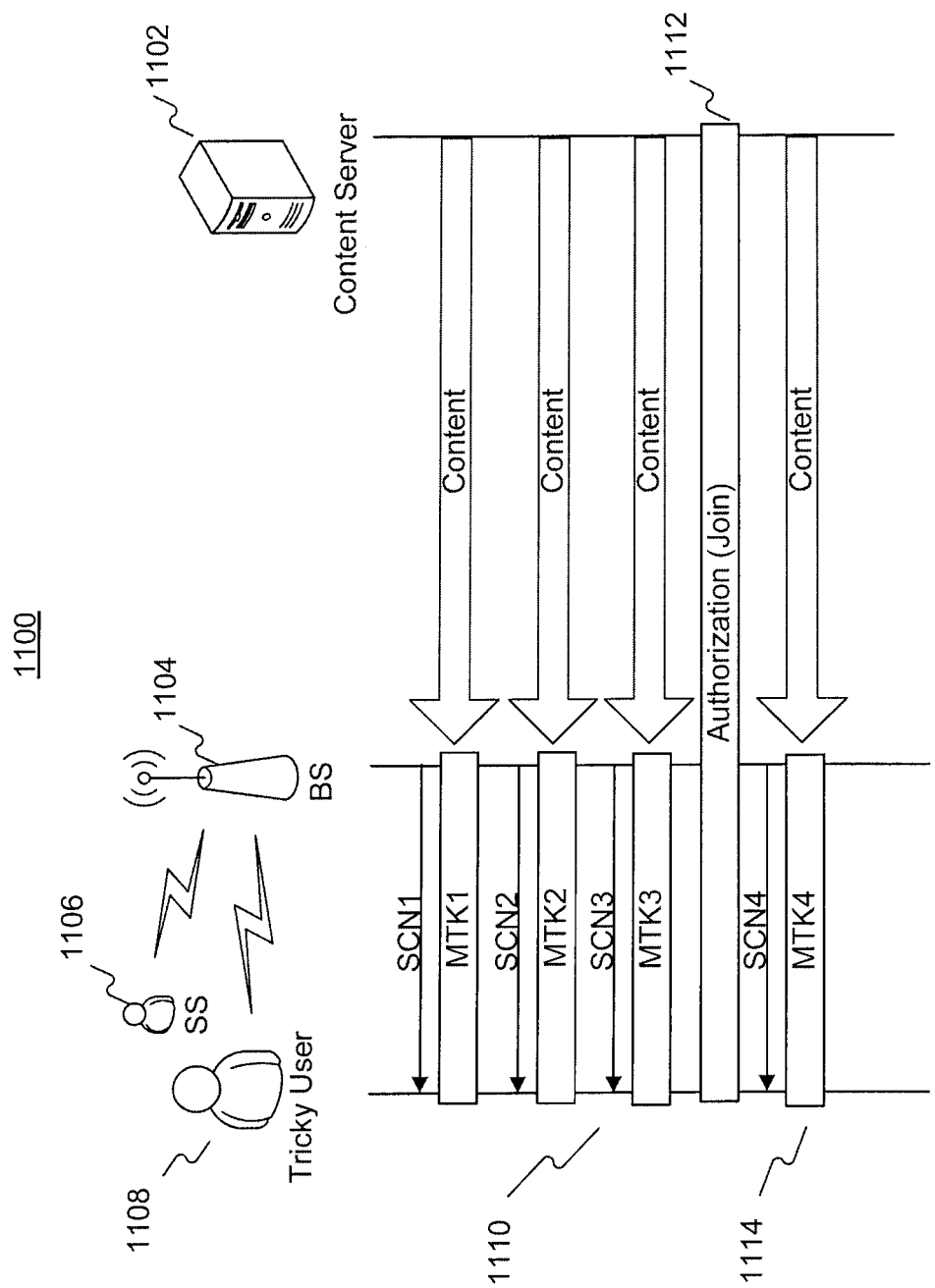
FIG. 11 illustrates an MBS data transmission process, according to an exemplary embodiment.

FIG. 11 illustrates an MBS data transmission process 11 00 based on the above-described key generating and updating methods, according to an exemplary embodiment. The process 1100 may prevent a tricky user from decrypting encrypted MBS content data. Referring to FIG. 11, an MBS content server 1102, a base station 1104, a subscriber station 1106, and a tricky user 1108 are shown to illustrate the data transmission process 1100.

In one exemplary embodiment, before the tricky user 1108 joins the MBSs, the base station 1104 transmits MBS content data to a plurality of subscriber stations including the subscriber station 1106 (1110). The MBS content data is encrypted with MTKs, such as first, second, and third MTKs MTK1, MTK2, and MTK3, respectively, which are generated based on first, second, and third SCNs SCN1, SCN2, and SCN3, respectively. The tricky user 1108 stores the encrypted MBS content data, wishing to decrypt the stored MBS content data after the tricky user 1108 joins the MBSs.

Later, the tricky user 1108 joins the MBSs and obtains a MAK during performing authorization with the MBS content server 1102 (1112). The tricky user 1108 then generates an MTK, e.g., MTK4, based on the MAK and a fourth SCN, e.g., SCN4 (1114) received from the base station 1104. Because the previously stored MBS content data is encrypted with MTK1, MTK2, or MTK3, the tricky user 1108 can not use MTK4 to decrypt the previously stored MBS content data.

Figure 12:
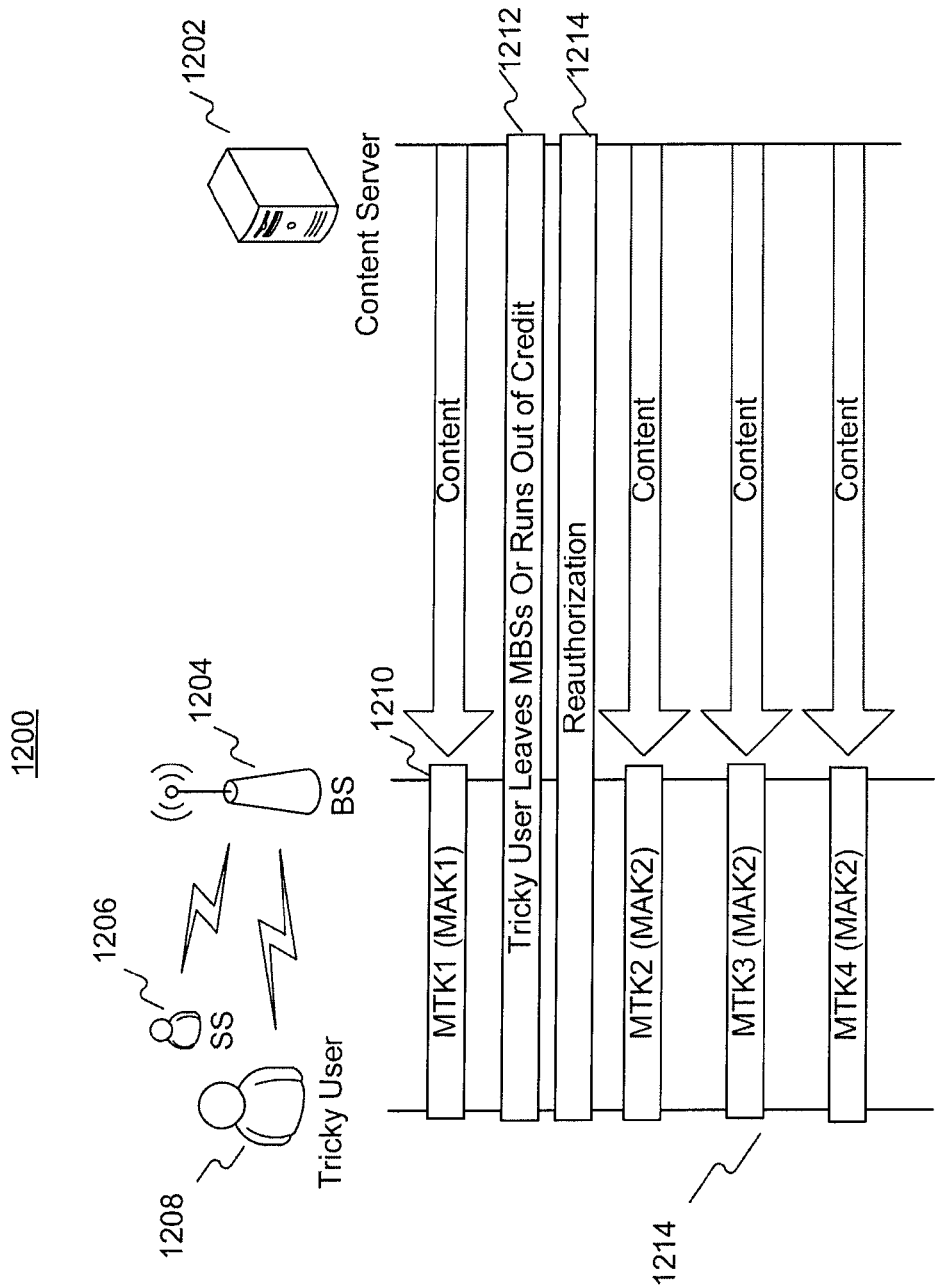
FIG. 12 illustrates an MBS data transmission process, according to an exemplary embodiment.

FIG. 12 illustrates an MBS data transmission process 1200 based on the above-described key generating and updating methods, according to an exemplary embodiment. The process 1200 may prevent a tricky user from continuing to receive MBSs after the tricky user leaves the MBSs. Referring to FIG. 12, an MBS content server 1202, a base station 1204, a subscriber station 1206, and a tricky user 1208 are shown to illustrate the data transmission process 1200.

In one exemplary embodiment, before the tricky user 1208 leaves the MBSs, the base station 1204, the subscriber station 1206, and the tricky user 1208 may generate an MTK, e.g., MTK1, based on a MAK, e.g., MAK1. The base station 1204 encrypts MBS content data with MTK1. The subscriber station 1206 and the tricky user 1208 decrypt with MTK1 the encrypted MBS data received from the base station 1204 (1210).

After the tricky user 1208 leaves the MBSs or runs out of credit (1212), the subscriber station 1206 performs reauthorization with the content server 1202, to obtain an updated MAK, e.g., MAK2 (1214). The base station 1204 uses MAK2 to generate updated MTKs such as MTK2, MTK3, and MTK4, and encrypts MBS content data with MTK2, MTK3, or MTK4 (1214). The subscriber station 1206 also uses MAK2 to generate updated MTKs MTK2, MTK3, and MTK4, and decrypt with MTK2, MTK3, or MTK4 the encrypted MBS content data received from the base station 1204. However, because the tricky user 1208 does not have MAK2, the tricky user 1208 can not generate MTK2, MTK3, or MTK4. As a result, the tricky user 1208 can not decrypt the encrypted MBS data received from the base station 1204 after the tricky user 1208 leaves the MBSs or runs out of credit.

Figure 13:
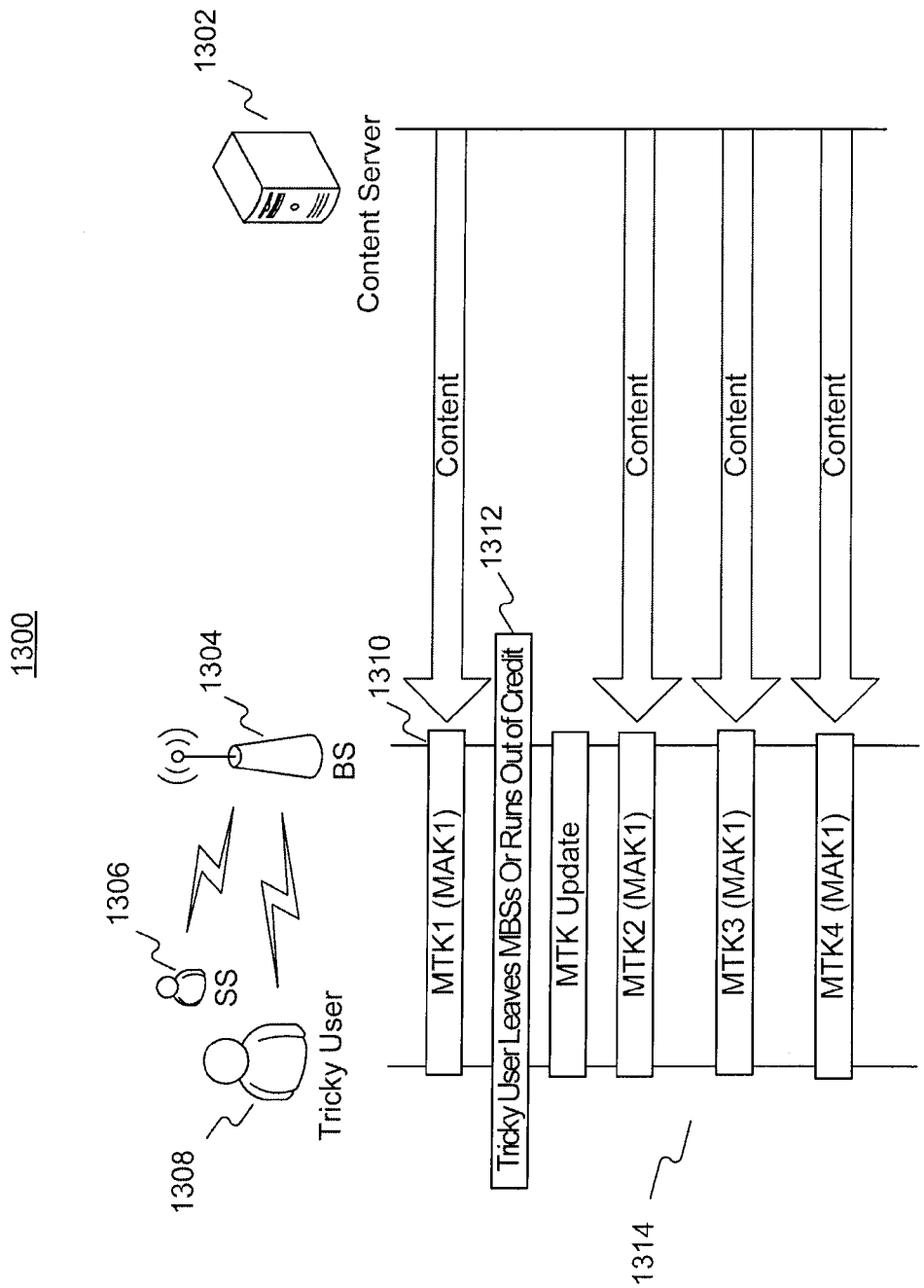
FIG. 13 illustrates an MBS data transmission process, according to an exemplary embodiment.

FIG. 13 illustrates an MBS data transmission process 1300 based on the above-described key generating and updating methods, according to an exemplary embodiment. The process 1300 may prevent a tricky user from continuing to receive MBSs after the tricky user leaves the MBSs. Referring to FIG. 13, an MBS content server 1302, a base station 1304, a subscriber station 1306, and a tricky user 1308 are shown to illustrate the data transmission process 1300.

In one exemplary embodiment, before the tricky user 1308 leaves the MBSs, the base station 1304, the subscriber station 1306, and the tricky user 1308 may generate an MTK, e.g., MTK1, based on a MAK, e.g., MAK1. The base station 1304 encrypts MBS content data with MTK1. The subscriber station 1306 and the tricky user 1308 decrypt with MTK1 the encrypted MBS data received from the base station 1304 (1310).

After the tricky user 1308 leaves the MBSs or runs out of credit (1312), the base station 1304 generates updated MTKs, such as MTK2, MTK3, and MTK4, based on MAK1 and updated SCNs or MGTEKs, and encrypt MBS content data with MTK2, MTK3, or MTK4 (1314). The base station 1304 also transmits the updated SCNs or MGTEKs to the subscriber station 1306. Accordingly, the subscriber station 1306 also generates MTK2, MTK3, and MTK4, and decrypts with MTK2, MTK3, and MTK4 the encrypted MBS data received from the base station 1304 (1314). However, because the tricky user 1308 does not have the updated SCNs or MGTEKs, the tricky user 1308 can not generate MTK2, MTK3, or MTK4. As a result, the tricky user 1308 can not decrypt the encrypted MBS content data received from the base station 1304 after the tricky user 1308 leaves the MBSs or runs out of credit.

Figure 14:
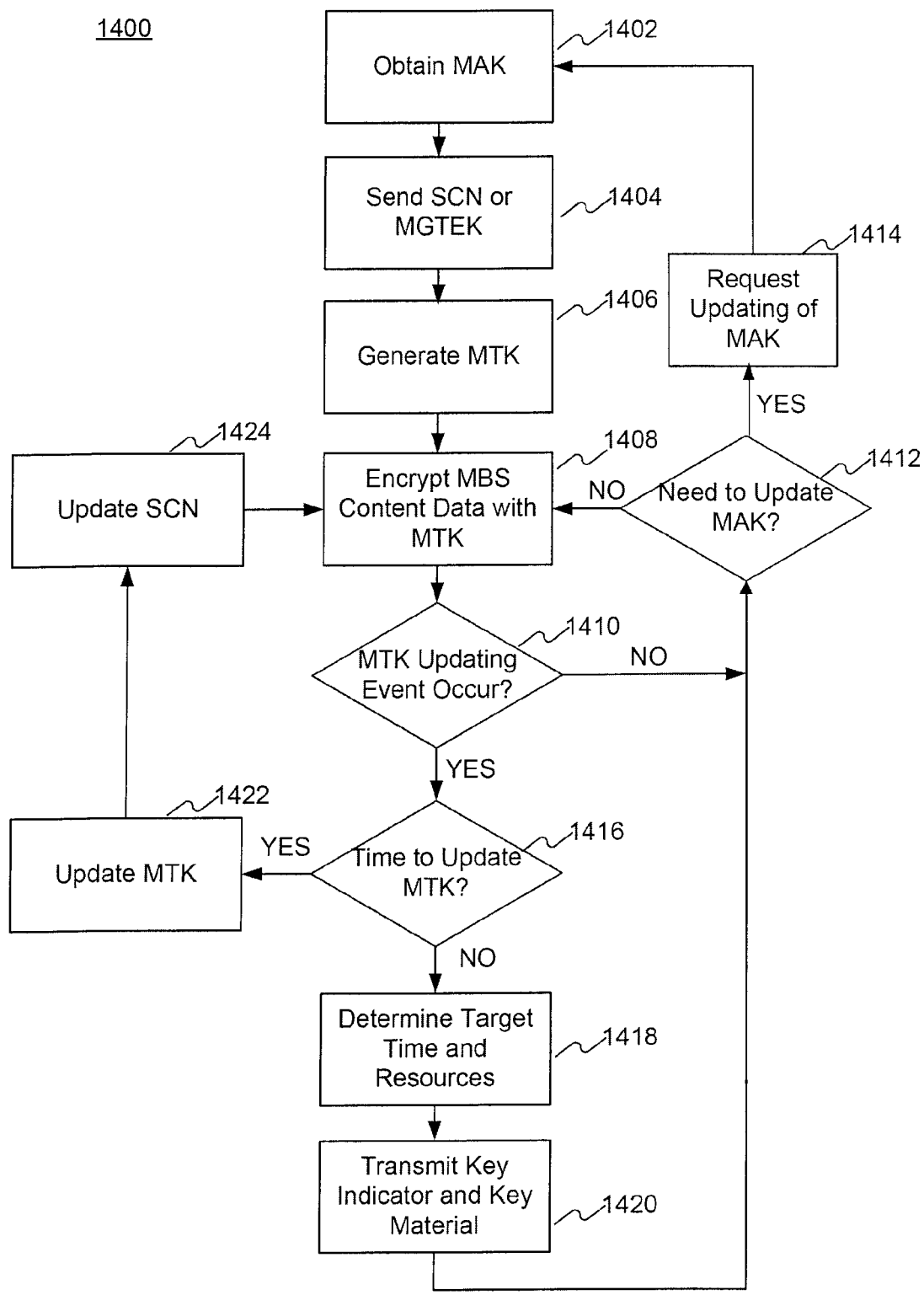
FIG. 14 illustrates a flow chart of an operation process for a base station to provide MBSs, according to an exemplary embodiment.

FIG. 14 illustrates a flow chart of an operation process 1400 for a base station to provide MBSs based on the above described key generating and updating methods, according to an exemplary embodiment. For example, the base station may be the base station 504-1 or 504-2 (FIG. 5).

Referring to FIG. 14, the base station obtains a master key such as a MAK from an MBS content server, e.g., during network entry or reentry (1402). The base station also generates a number, e.g., a random number, as an MGTEK, and sets an SCN with an initial value. The base station further sends the SCN or the MGTEK to subscriber stations based on, e.g., a multicast scheme (1404). The base station then generates an MTK based on the MAK, the MGTEK, and/or the SCN (1406). The base station further encrypts MBS content data with the MTK (1408).

Next, the base station determines if an MTK updating event occurs (1410), as described above. If the base station determines that an MTK updating event does not occur (1410—No), the base station further determines if there is a need to update the MAK (1412). If the base station determines that there is no need to update the MAK (1412—No), the base station continues to encrypt MBS content data with the present MTK (1408). If the base station determines that there is a need to update the MAK (1412—Yes), the base station requests the MBS content server to update the MAK (1414), and the process returns to 1402.

If the base station determines that an MTK updating event occurs (1410—Yes), the base station further determines if it is time to update the MTK (1416). If the base station determines that it is not time to update the MTK (1416—No), the base station determines a target time to update the MTK, and time and frequency resources for transmitting key material including the SCN or the MGTEK (1418). The base station further transmits a key indicator indicating the time and frequency resources and the key material (1420). Step 1412 is then performed. If the base station determines that it is the time to update the MTK (1416—Yes), the base station updates the MTK (1422). The base station further updates the SCN (1424), e.g., resets or increases the SCN, and step 1408 is repeated.

Figure 15:
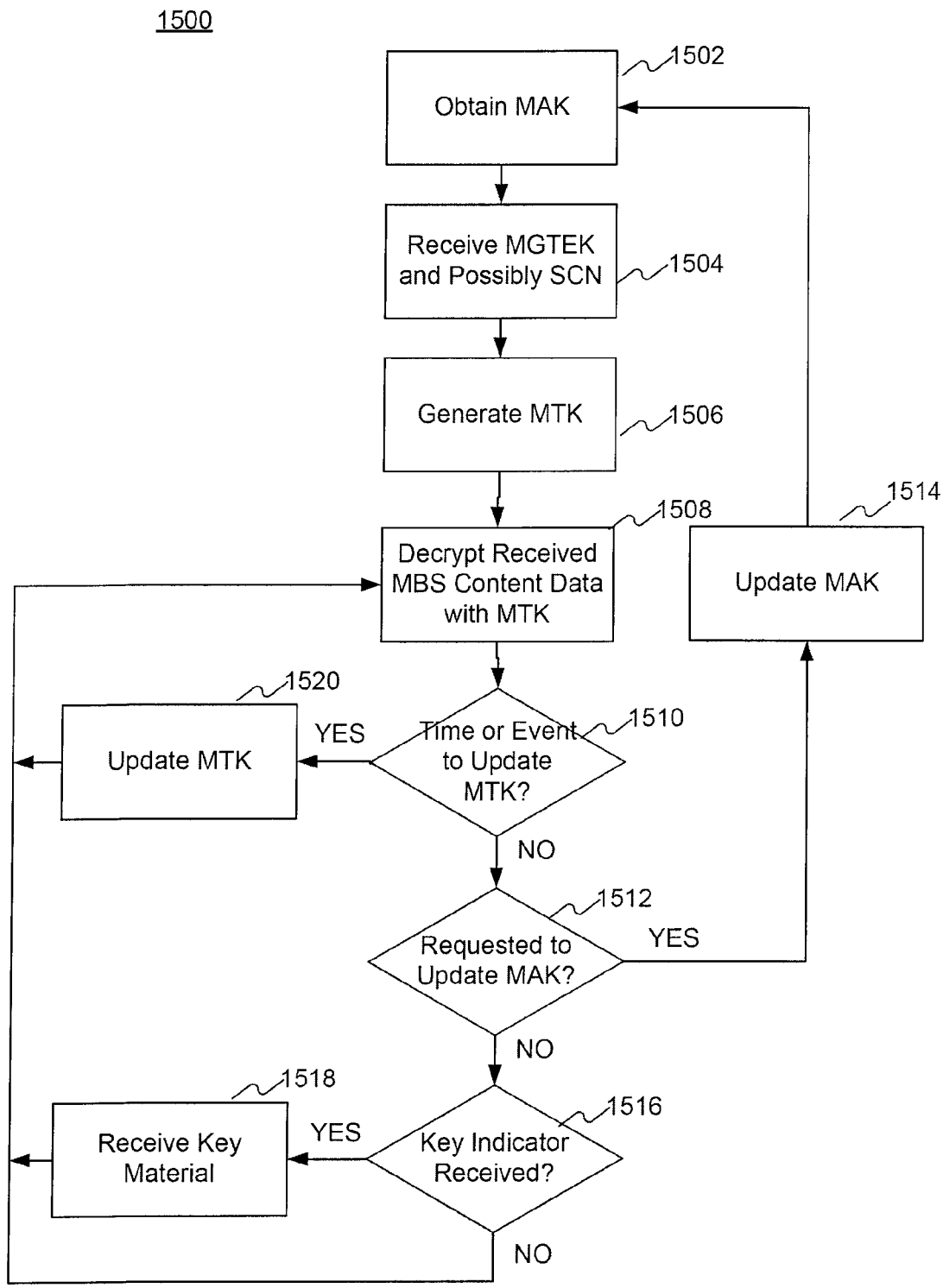
FIG. 15 illustrates a flow chart of an operation process for a subscriber station to receive MBSs, according to an exemplary embodiment.

FIG. 15 illustrates a flow chart of an operation process 1500 for a subscriber station to receive MBSs based on the above described key generating and updating methods, according to an exemplary embodiment. For example, the subscriber station may be the subscriber station 508 (FIG. 5).

Referring to FIG. 15, the subscriber station obtains a master key such as a MAK from an MBS content server, e.g., during network entry or reentry (1502). The subscriber station also receives an MGTEK and an SCN, or only the MGTEK, from a base station (1504), depending on whether the base station uses the method 600 (FIG. 6) or the method 700 (FIG. 7) to generate the MTK. The subscriber station then generates an MTK based on the MAK, the MGTEK, and the SCN, or based on only the MAK and the MGTEK (1506). The subscriber station further decrypts with the MTK encrypted MBS content data received from the base station (1508).

Next, the subscriber station determines if it is time or an event occurs to update the MTK (1510). For example, the subscriber station may be notified of the time to update the MTK by the base station. If the subscriber station determines that it is not the time to update the MTK (1510—No), the subscriber station further determines if it is requested to update the MAK (1512). If the subscriber station determines that it is requested to update the MAK (1512—Yes), the subscriber station performs reauthorization with an MBS content server to update the MAK (1514), and the process returns to 1502. If the subscriber station determines that it is not requested to update the MAK (1512—No), the subscriber station further determines if it has received a key indicator (1516). If the subscriber station determines that it has received the key indicator (1516—Yes), the subscriber station further receives key material including an MGTEK and possibly an SCN on time and frequency resources indicated by the key indicator (1518). The subscriber station continues to decrypt with the present MTK encrypted MBS data received from the base station (1508), before it is the time or the event occurs to update the MTK. If the subscriber station determines that it is the time or the event occurs to update the MTK (1510—Yes), the subscriber station updates the MTK based on the received key material (1520). Step 1508 is then repeated.

Figure 16:
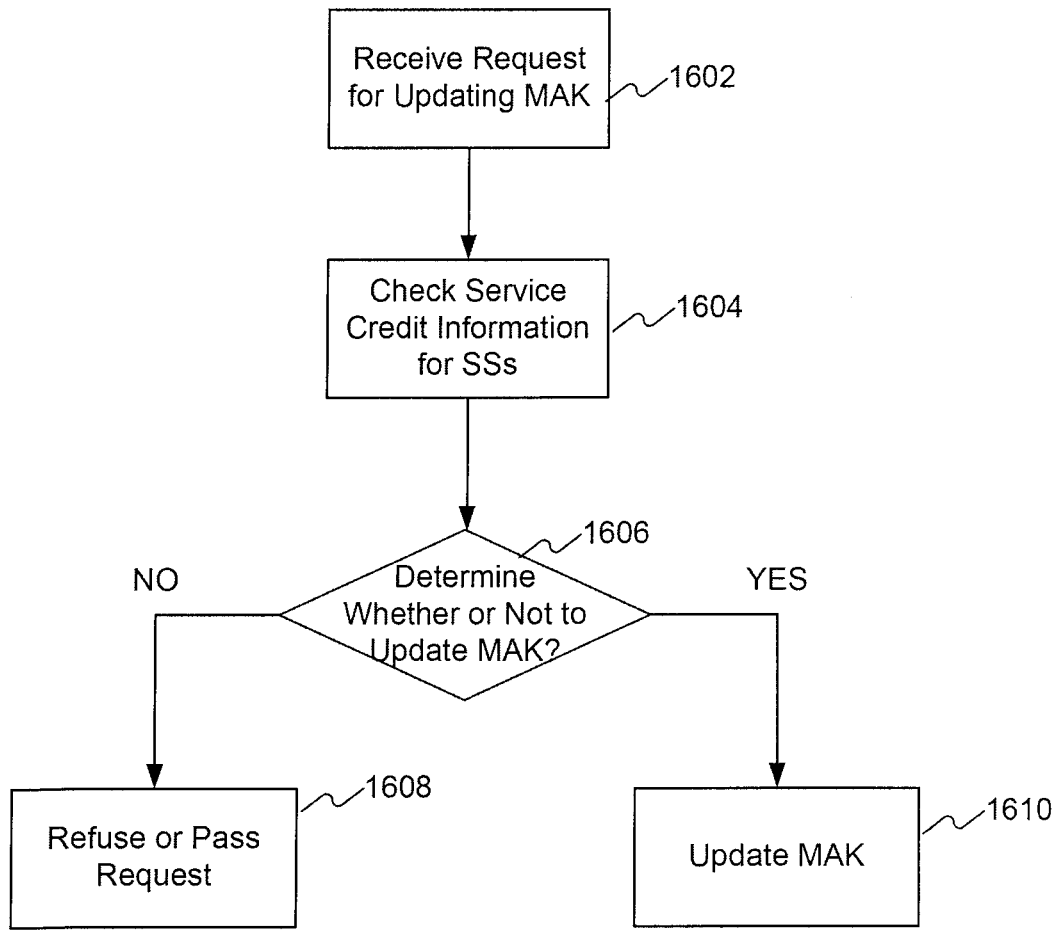
FIG. 16 illustrates a flow chart of an operation process for an MBS content server to provide MBSs, according to an exemplary embodiment.

FIG. 16 illustrates a flow chart of an operation process 1600 for an MBS content server to provide MBSs, according to an exemplary embodiment. For example, the MBS content server may be the MBS content server 502-1, 502-2, or 502-3 (FIG. 5).

Referring to FIG. 16, the MBS content server receives a request for updating a MAK (1602). Accordingly, the MBS content server checks service credit information for subscriber stations (1604), and determines whether or not to update the MAK (1606). For example, if there is no new subscriber station joining the MBSs or there is no existing subscriber station leaving the MBSs, and each subscriber station has enough credit, the MBS content server may determine not to update the MAK. If the MBS content server determines not to update the MAK (1606—No), the MBS content server refuses or passes the request (1608). If the content server determines to update the MAK (1606—Yes), the MBS content server updates the MAK (1610).

In exemplary embodiments, the above described key generating and updating methods may be used in a single frequency network (SFN). An SFN is a broadcast network in which a plurality of base stations or transmitters simultaneously send substantially the same signal. The base stations or transmitters are typically synchronized based on a synchronization protocol or technique, such as signaling message exchange, or synchronization according to global positioning system (GPS) signals. In addition, the base stations or transmitters may be coordinated by a particular station. For example, a central gateway may coordinate all the base stations or transmitters in the SFN. After the base stations or transmitters are synchronized, the base stations or transmitters can simultaneously send substantially the same signal. Referring back to FIG. 5, in exemplary embodiments, the network 506 may be an SFN. Accordingly, the base stations 504-1 and 504-2 may synchronously update an MTK. As a result, for example, when the subscriber station 508 moves from an area covered by the base station 504-1 to an area covered by the base station 504-2, there is no need to perform MTK updating due to the movement.

Figure 17:
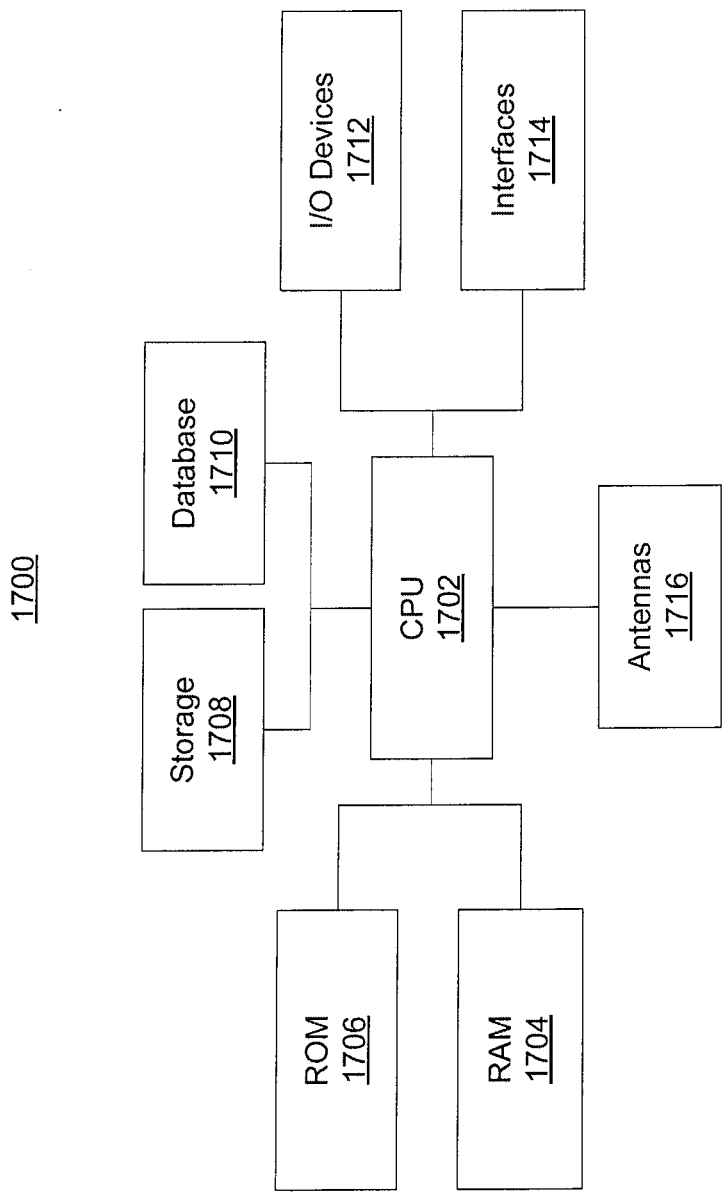
FIG. 17 illustrates a block diagram of a base station, according to an exemplary embodiment.

FIG. 17 illustrates a block diagram of a base station 1700, according to an exemplary embodiment. For example, the base station 1700 may be any base station noted above in explanation of the embodiments in FIGS. 5-16. Referring to FIG. 17, the base station 1700 may include one or more of the following components: at least one central processing unit (CPU) 1702 configured to execute computer program instructions to perform various processes and methods, random access memory (RAM) 1704 and read only memory (ROM) 1706 configured to access and store information and computer program instructions, storage 1708 to store data and information, databases 1710 to store tables, lists, or other data structures, I/O devices 1712, interfaces 1714, antennas 1716, etc. Each of these components is well-known in the art and will not be discussed further.

Figure 18:
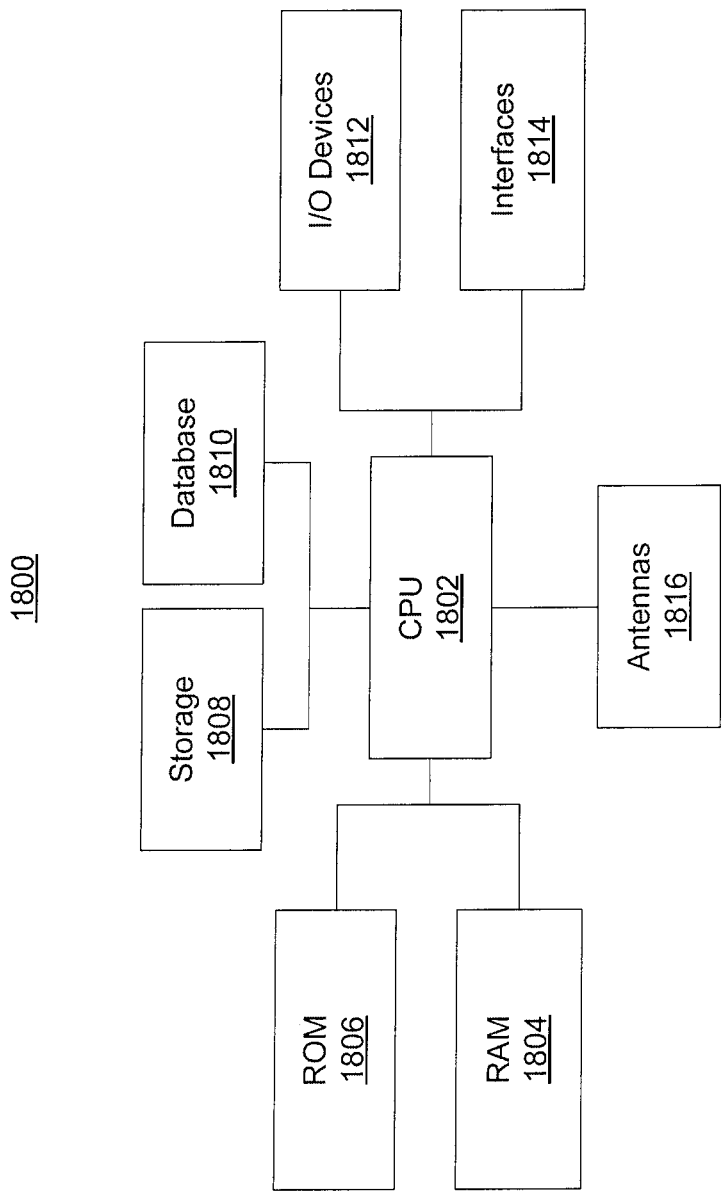
FIG. 18 illustrates a block diagram of a subscriber station, according to an exemplary embodiment.

FIG. 18 illustrates a block diagram of a subscriber station 1800, according to an exemplary embodiment. For example, the subscriber station 1800 may be any subscriber station noted above in explanation of the embodiments in FIGS. 5-16. Referring to FIG. 18, the subscriber station 1800 may include one or more of the following components: at least one central processing unit (CPU) 1802 configured to execute computer program instructions to perform various processes and methods, random access memory (RAM) 1804 and read only memory (ROM) 1806 configured to access and store information and computer program instructions, storage 1808 to store data and information, databases 1810 to store tables, lists, or other data structures, I/O devices 1812, interfaces 1814, antennas 1816, etc. Each of these components is well-known in the art and will not be discussed further.

Other embodiments of the invention will be apparent to those skilled in the art from consideration of the specification and practice of the disclosure disclosed herein. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for a base station to provide multicast broadcast services (MBSs), comprising:
    obtaining an MBS authorization key (MAK);
    generating a number as an MBS group traffic encryption key (MGTEK);
    using a service credit number (SCN) to count an amount of service time or MBS content data;
    generating an MBS traffic key (MTK) using as input parameters the SCN and at least one of the MAK and the MGTEK;
    encrypting MBS content data with the MTK;
    transmitting the encrypted MBS content data to provide the MBSs;
    updating the SCN;
    updating the MGTEK when the SCN is updated; and
    updating the MTK based on the updated MGTEK.

2. The method of claim 1, wherein the obtaining further comprises obtaining the MAK from an MBS content server.

3. The method of claim 2, further comprising:
    requesting, based on the SCN, the MBS content server or at least one subscriber station to update the MAK.

4. The method of claim 1, further comprising:
    transmitting a key indicator, the key indicator indicating an event or time and frequency resources for transmitting the MGTEK; and
    transmitting the MGTEK according to the indicated event or time and frequency resources.

5. The method of claim 1, further comprising:
    transmitting a key indicator, the key indicator indicating an event or time and frequency resources for transmitting the SCN; and
    transmitting the SCN according to the indicated event or time and frequency resources.

6. The method of claim 5, wherein the base station provides the MBSs to a subscriber station, the method further comprising:
    notifying the subscriber station of a time or an event to update the MTK.

7. A base station to provide multicast broadcast services (MBSs), comprising:
    a processor, the processor being configured to:
    obtain an MBS authorization key (MAK);
    generate a number as an MBS group traffic encryption key (MGTEK);
    use a service credit number (SCN) to count an amount of service time or MBS content data;
    generate an MBS traffic key (MTK) using as input parameters the SCN and at least one of the MAK and the MGTEK;
    encrypt MBS content data with the MTK;
    transmit the encrypted MBS content data to provide the MBSs;
    update the SCN;
    update the MGTEK when the SCN is updated; and
    update the MTK based on the updated MGTEK.

8. The base station of claim 7, being further configured to transmit the encrypted MBS content data in a broadcast network in which a plurality of base stations simultaneously send a same signal.

9. A method for a subscriber station to receive multicast broadcast services (MBSs) from a base station, comprising:
    obtaining an MBS authorization key (MAK);
    receiving, from the base station, an MBS group traffic encryption key (MGTEK), a service credit number (SCN), and encrypted MBS content data;
    generating an MBS traffic key (MTK) using as input parameters the SCN and at least one of the MAK and the MGTEK;
    decrypting the encrypted MBS content data with the MTK to receive the MBSs;
    wherein the MGTEK is a number generated by the base station; and
    the SCN is used by the base station to count an amount of service time or MBS content data;
    wherein the base station is configured to:
    update the SCN;
    update the MGTEK when the SCN is updated; and
    update the MTK based on the updated MGTEK.

10. The method of claim 9, wherein the obtaining further comprises obtaining the MAK from an MBS content server.

11. The method of claim 9, further comprising:
    receiving a key indicator from the base station, the key indicator indicating an event or time and frequency resources for receiving the MGTEK; and
    receiving the MGTEK according to the indicated event or time and frequency resources.

12. The method of claim 9, further comprising:
    receiving a key indicator, the key indicator indicating an event or time and frequency resources for receiving the SCN; and
    receiving the SCN according to the indicated event or time and frequency resources.

13. The method of claim 9, further comprising:
    receiving a notification of a time or an event to update the MTK; and
    updating the MTK at the time or when the event occurs.

14. A subscriber station to receive multicast broadcast services (MBSs) from a base station, comprising:
    a processor, the processor being configured to:
    obtain an MBS authorization key (MAK);
    receive, from the base station, an MBS group traffic encryption key (MGTEK), a service credit number (SCN), and encrypted MBS content data;
    generate an MBS traffic key (MTK) using as input parameters the SCN and at least one of the MAK and the MGTEK;
    decrypt the encrypted MBS content data with the MTK;
    wherein the MGTEK is a number generated by the base station; and the SCN is used by the base station to count an amount of service time or MBS content data;
wherein the base station is configured to:
update the SCN;
update the MGTEK when the SCN is updated; and
update the MTK based on the updated MGTEK.

15. The subscriber station of claim 14, being further configured to receive the encrypted MBS content data in a broadcast network in which a plurality of base stations simultaneously send a same signal.

* * * * *